(12) United States Patent
Zhang et al.

(10) Patent No.: US 10,587,493 B2
(45) Date of Patent: Mar. 10, 2020

(54) DEVICE TO DEVICE DISCOVERY RESOURCE ALLOCATION

(71) Applicant: Nokia Technologies Oy, Espoo (FI)

(72) Inventors: Zhi Zhang, Beijing (CN); Juha Sakari Korhonen, Espoo (FI); Kodo Shu, Shanghai (CN); Zexian Li, Espoo (FI); Haipeng Lei, Beijing (CN); Yixue Lei, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/112,817

(22) PCT Filed: Jan. 30, 2014

(86) PCT No.: PCT/CN2014/071852
§ 371 (c)(1),
(2) Date: Jul. 20, 2016

(87) PCT Pub. No.: WO2015/113311
PCT Pub. Date: Aug. 6, 2015

(65) Prior Publication Data
US 2016/0345374 A1 Nov. 24, 2016

(51) Int. Cl.
*H04W 76/02* (2009.01)
*H04L 12/26* (2006.01)
(Continued)

(52) U.S. Cl.
CPC ............. *H04L 43/16* (2013.01); *H04W 8/005* (2013.01); *H04W 24/10* (2013.01); *H04W 72/00* (2013.01);
(Continued)

(58) Field of Classification Search
CPC ............. Y02D 70/144; Y02D 70/1224; Y02D 70/1264; Y02D 70/21; Y02D 70/146;
(Continued)

(56) References Cited

U.S. PATENT DOCUMENTS 9,572,171 B2 * 2/2017 Li ............................ H04W 4/60
9,854,566 B2 * 12/2017 Jung ...................... H04W 76/14
(Continued)

FOREIGN PATENT DOCUMENTS

CN 102714861 A 10/2012
CN 102857901 A 1/2013
(Continued)

OTHER PUBLICATIONS

"Introduction Of Prose", 3GPP TSG-RAN2 Meeting #88, R2-145140, Samsung, Nov. 17-21, 2014, 59 pages.
(Continued)

*Primary Examiner* — Jung Liu
(74) *Attorney, Agent, or Firm* — Squire Patton Boggs (US) LLP (57) ABSTRACT

Various communication systems may benefit from techniques and systems for resource allocation. For example, communication systems of the third generation partnership project may benefit from device to device discovery resource allocation methods and systems. A method can include determining that downlink data transmission may cause conflict between uplink control channel transmission and device to device discovery signal transmissions or that uplink shared channel transmissions may conflict with device to device discovery signal transmissions; and requesting a user equipment to report device to device discovery needs based on the determining.

21 Claims, 3 Drawing Sheets

(51) Int. Cl.
| | |
|---|---|
| *H04W 8/00* | (2009.01) |
| *H04W 72/00* | (2009.01) |
| *H04W 72/04* | (2009.01) |
| *H04W 76/14* | (2018.01) |
| *H04W 24/10* | (2009.01) |
| *H04W 72/12* | (2009.01) |
| *H04W 92/18* | (2009.01) |

(52) U.S. Cl.
CPC ....... *H04W 72/04* (2013.01); *H04W 72/0413* (2013.01); *H04W 72/1273* (2013.01); *H04W 76/14* (2018.02); *H04W 92/18* (2013.01)

(58) Field of Classification Search
CPC ........... Y02D 70/1222; Y02D 70/1226; Y02D 70/22; Y02D 70/23; Y02D 70/142; Y02D 70/1262; Y02D 70/00; Y02D 70/1242; H04W 48/18; H04W 72/042; H04W 72/02

See application file for complete search history.

(56) References Cited

U.S. PATENT DOCUMENTS

| | | | |
|---|---|---|---|
| 2011/0085513 A1* | 4/2011 | Chen | H04W 72/042 370/330 |
| 2013/0308551 A1* | 11/2013 | Madan | H04W 76/14 370/329 |
| 2014/0003262 A1* | 1/2014 | He | H04W 28/08 370/252 |
| 2014/0094183 A1* | 4/2014 | Gao | H04W 72/048 455/450 |
| 2014/0204898 A1* | 7/2014 | Yang | H04W 52/0219 370/329 |
| 2014/0269459 A1* | 9/2014 | Fan | H04W 24/06 370/294 |
| 2015/0043438 A1* | 2/2015 | Fwu | H04L 1/0027 370/329 |
| 2015/0043448 A1* | 2/2015 | Chatterjee | H04W 48/12 370/329 |
| 2015/0045016 A1* | 2/2015 | Xiong | H04W 72/08 455/426.1 |
| 2015/0099514 A1* | 4/2015 | Sartori | H04W 8/005 455/434 |
| 2015/0117183 A1* | 4/2015 | Heo | H04W 74/004 370/228 |
| 2015/0119055 A1* | 4/2015 | Shin | H04W 8/005 455/450 |
| 2015/0139006 A1 | 5/2015 | Seo et al. | |
| 2015/0208384 A1* | 7/2015 | Baghel | H04W 72/04 455/450 |
| 2015/0327189 A1* | 11/2015 | Seo | H04W 52/383 370/311 |
| 2015/0327311 A1* | 11/2015 | Wei | H04L 12/6418 370/329 |
| 2015/0341878 A1* | 11/2015 | Lee | H04W 56/004 370/329 |
| 2016/0007406 A1* | 1/2016 | Yi | H04W 52/0206 370/252 |
| 2016/0142898 A1* | 5/2016 | Poitau | H04W 76/14 370/329 |
| 2016/0150391 A1* | 5/2016 | Lee | H04W 56/002 370/329 |
| 2016/0255615 A1* | 9/2016 | Chatterjee | H04W 72/048 370/330 |

FOREIGN PATENT DOCUMENTS

| | | |
|---|---|---|
| CN | 102984699 A | 3/2013 |
| CN | 103118417 A | 5/2013 |
| CN | 103179575 A | 6/2013 |
| CN | 103327568 A | 9/2013 |
| WO | 2013/017154 A1 | 2/2013 |
| WO | 2014/003457 A1 | 1/2014 |
| WO | 2014/008073 A1 | 1/2014 |

OTHER PUBLICATIONS

"3rd Generation Partnership Project; Technical Specification Group Radio Access Network; Evolved Universal Terrestrial Radio Access (E-UTRA); Radio Resource Control (RRC);Protocol specification (Release 12)", 3GPP TS 36.331, V12.3.0, Sep. 2014, pp. 1-378.
Office action received for corresponding Taiwan Patent Application No. 104101972, dated Mar. 28, 2016, 5 pages of office action and 3 pages of office action translation available.
"3rd Generation Partnership Project; Technical Specification Group Radio Access Network; Evolved Universal Terrestrial Radio Access (E-UTRA); Radio Resource Control (RRC);Protocol specification (Release 12)", 3GPP TS 36.331, V12.5.0, Mar. 2015, pp. 1-445.
Office action received for corresponding Taiwan Patent Application No. 104101972, dated Jan. 20, 2017, 6 pages of office action and 3 pages of office action translation available.
Office action received for corresponding Thailand Patent Application No. 1601004397, dated Jun. 8, 2017, 2 pages of office action and 1 pages of office action translation available.
International Search Report and Written Opinion received for corresponding Patent Cooperation Treaty Application No. PCT/CN2014/071852, dated Nov. 2, 2014, 12 pages.
Partial Supplementary European Search Report received for corresponding European Patent Application No. 14880859.5, dated Sep. 13, 2017, 13 pages.
"Consideration on Resource Allocation for D2D Discovery", 3GPP TSG-RAN Working Group 2 meeting #84, R2-134401, Agenda: 7.5.2, Interdigital Communications, Nov. 11-15, 2013, pp. 1-4.
"Enhancements for Efficient Relaying Operations", 3GPP TSG-RAN Working Group 1 meeting #74, R1-133386, Agenda: 7.2.8.1, LG Electronics, Aug. 19-23, 2013, pp. 1-5.
"Evaluations Results for D2D Discovery with PRACH and SRS", 3GPP TSG-RAN Working Group 1 meeting #74, R1-133179, Agenda: 7.2.8.2, Interdigital, Aug. 19-23, 2013, 5 pages.
Korean Intellectual Property Office, Office Action corresponding to Application No. 2016-7023820, Mar. 26, 2018.
3GPP TSG RAN WG2 Meeting #84, "Consideration on D2D Discovery Resource Allocation", CATT, Agenda: 7.5.2, Ljubljana, Slovenia, Oct. 11-15, 2013, R2-134062, pp. 1-4.
Extended European Search Report received for corresponding European Patent Application No. 14880859.5, dated Dec. 12, 2017, 18 pages.
European Office Action corresponding to Appln. No. 14 880 859.5, dated Oct. 26, 2018.
Chinese Office Action corresponding to Application No. 201480076761.3, dated Mar. 5, 2019.
Chinese Office Action corresponding to CN Application No. 201480076761.3, dated Sep. 4, 2019.
European Office Action corresponding to EP Appln. No. 14880859.5, dated Sep. 25, 2019.
Vietnames Office Action corresponding to VN Appln. No. 1-2016-03058, dated Nov. 8, 2019.

* cited by examiner

DEVICE TO DEVICE DISCOVERY RESOURCE ALLOCATION

RELATED APPLICATION

This application was originally filed as Patent Cooperation Treaty Application No. PCT/CN2014/071852 filed Jan. 30, 2016.

BACKGROUND

Field

Various communication systems may benefit from techniques and systems for resource allocation. For example, communication systems of the third generation partnership project may benefit from device to device discovery resource allocation methods and systems.

Description of the Related Art

Third generation partnership project (3GPP) long term evolution advanced (LTE-A) release 12 or 13 (Rel-12/13) may include features related to device to device discovery and communications. Currently, proximity services (ProSe)/Device-to-Device (D2D) discovery and communication is one issue that is relevant to such standardization. D2D discovery is one of the D2D scenarios that can be considered.

In 3GPP D2D discovery, at least two types of resource allocation methods are thought to be possible: Type-1 & Type-2 resource allocation. For Type-1 resource allocation, D2D discovery devices, such as a user equipment (UE), conventionally share a common resource pool. Thus, a UE can autonomously select the resource to be used for discovery signal transmission. For Type-2 resource allocation, eNB can conventionally assign a UE-specific resource for discovery signal transmission. Idle mode UEs are supposed to be able to discover other UEs and be discovered by other UEs. Thus, supporting Type-1 resource allocation may be necessary in order for an idle mode UE to obtain resources without the need to enter into Radio Resource Control connected (RRC_connected) state for resource allocation, as with Type-2 resource allocation.

A D2D discovery signal can be sent on a cellular uplink (UL) subframe (SF). In this discussion, this subframe is referred to as a "D2D SF". Moreover, cellular and D2D data may not be allowed to be multiplexed in a frequency division multiplexing (FDM) way from one UE perspective. According to such an approach, if a UE sends a discovery signal in a D2D SF, this UE cannot transmit on a physical uplink control channel (PUCCH) or on a physical uplink shared channel (PUSCH) simultaneously in the same SF, namely in the D2D SF.

If RRC_Connected mode UEs use type-1 resource allocation, a potential issue arises when cellular and D2D traffic co-exist and when a connected mode UE is very heavily scheduled in DL. For example, if one UE has DL data transmission on physical downlink shared channel (PDSCH) in every DL SF, this UE will conventionally consequently send acknowledgment/negative acknowledgment (ACK/NACK or A/N) on PUCCH on every UL SF. The resulting issue is that this UE will conventionally find no place to send discovery message.

Similarly, if UE is heavily scheduled on PUSCH, UE will conventionally have reduced possibilities for discovery signal transmission.

One way to address this issue is to set D2D discovery signal transmission with higher priority than cellular data or control. However, with Type-1 resource allocation, the eNB cannot conventionally predict in which UL SF UE will send D2D discovery signal. If D2D discovery signal were set with higher priority, eNB would have to assume that any PUCCH in D2D SF could be unavailable, which would affect cellular services, as there would be DL retransmissions of data for which UEs were not able to send A/N. Likewise, DL would also be affected because of UEs not being able to send channel quality information (CQI) in the normal way. If discovery signal transmissions would prevent utilizing a scheduled PUSCH resource, UL resources would be wasted.

SUMMARY

According to certain embodiments, a method can include determining that an amount of downlink data for a user equipment meets a predetermined threshold. The method can also include requesting the user equipment to report device to device discovery needs based on the amount meeting the predetermined threshold.

In certain embodiments, a method can include receiving a request to provide a report of device to device discovery needs. The method can also include reporting the device to device discovery needs to a network element.

An apparatus, according to certain embodiments, can include at least one processor and at least one memory including computer program code. The at least one memory and computer program code can be configured to, with the at least one processor, cause the apparatus at least to determine that an amount of downlink data for a user equipment meets a predetermined threshold. The at least one memory and computer program code can also be configured to, with the at least one processor, cause the apparatus at least to request the user equipment to report device to device discovery needs based on the amount meeting the predetermined threshold.

An apparatus, in certain embodiments, can include at least one processor and at least one memory including computer program code. The at least one memory and computer program code can be configured to, with the at least one processor, cause the apparatus at least to receive a request to provide a report of device to device discovery needs. The at least one memory and computer program code can also be configured to, with the at least one processor, cause the apparatus at least to report the device to device discovery needs to a network element.

According to certain embodiments, an apparatus can include means for determining that an amount of downlink data for a user equipment meets a predetermined threshold. The apparatus can also include means for requesting the user equipment to report device to device discovery needs based on the amount meeting the predetermined threshold.

In certain embodiments, an apparatus can include means for receiving a request to provide a report of device to device discovery needs. The apparatus can also include means for reporting the device to device discovery needs to a network element.

A non-transitory computer-readable medium can, according to certain embodiments, be encoded with instructions that, when executed in hardware, perform a process. The process can include determining that an amount of downlink data for a user equipment meets a predetermined threshold. The process can also include requesting the user equipment to report device to device discovery needs based on the amount meeting the predetermined threshold.

A non-transitory computer-readable medium can, in certain embodiments, be encoded with instructions that, when executed in hardware, perform a process. The process can include receiving a request to provide a report of device to device discovery needs. The process can also include reporting the device to device discovery needs to a network element.

According to certain embodiments, a computer program product can encode instructions for performing a process. The process can include determining that an amount of downlink data for a user equipment meets a predetermined threshold. The process can also include requesting the user equipment to report device to device discovery needs based on the amount meeting the predetermined threshold.

In certain embodiments, a computer program product can encode instructions for performing a process. The process can include receiving a request to provide a report of device to device discovery needs. The process can also include reporting the device to device discovery needs to a network element.

According to certain embodiments, a method can include determining that a user equipment's opportunities to transmit device-to-device discovery signals are lower than a predefined value. The method can also include requesting Type-2 resources or requesting to prioritize the transmitting of the discovery signals.

In certain embodiments, an apparatus can include at least one processor and at least one memory including computer program code. The at least one memory and computer program code can be configured to, with the at least one processor, cause the apparatus at least to determine that a user equipment's opportunities to transmit device-to-device discovery signals are lower than a predefined value. The at least one memory and computer program code can also be configured to, with the at least one processor, cause the apparatus at least to request Type-2 resources or request to prioritize the transmitting of the discovery signals.

An apparatus, according to certain embodiments, can include means for determining that a user equipment's opportunities to transmit device-to-device discovery signals are lower than a predefined value. The apparatus can also include means for requesting Type-2 resources or requesting to prioritize the transmitting of the discovery signals.

According to certain embodiments, a computer program product can encode instructions for performing a process. The process can include determining that a user equipment's opportunities to transmit device-to-device discovery signals are lower than a predefined value. The process can also include requesting Type-2 resources or requesting to prioritize the transmitting of the discovery signals.

A non-transitory computer-readable medium can, in certain embodiments, be encoded with instructions that, when executed in hardware, perform a process. The process can include determining that a user equipment's opportunities to transmit device-to-device discovery signals are lower than a predefined value. The process can also include requesting Type-2 resources or requesting to prioritize the transmitting of the discovery signals.

BRIEF DESCRIPTION OF THE DRAWINGS

For proper understanding of the invention, reference should be made to the accompanying drawings, wherein.

DETAILED DESCRIPTION

Certain embodiments may provide a better way of handling device to device discovery signal transmissions, while avoiding multiplexing cellular and D2D data in a frequency division multiplexing way from the standpoint of one user equipment.

For example, in certain embodiments, when an evolved node B (eNB) finds out a large amount of DL data is to be scheduled for one RRC_Connected mode UE, it can request the UE to report the UE's own D2D discovery needs. A report may also be requested if eNB finds that the UE is transmitting frequently at PUSCH.

The eNB can indicate UE to report its D2D discovery needs and can assign an UL resource for sending the report with a predetermined PUCCH reporting format. Alternatively, the eNB may just indicate that the UE is to send a report, without assigning PUCCH resources for such a report. In this case, the UE can send the report on PUSCH. With the report, the UE can request Type-2 resources or ask the eNB to prioritize the UE's participation in D2D discovery.

Alternatively, or in addition to the above, when the UE finds out that the UE's opportunities to transmit discovery signals are lower than a predefined value, due to the frequent PUCCH transmissions or scheduled PUSCH transmissions, the UE may indicate the problematic situation to the eNB through a new higher layer signaling (MAC CE or RRC) carried on PUSCH. Such a predefined value can be a parameter configured by the eNB. The eNB may define such a value as, for example, the number of transmit opportunities during a given interval, which can be deemed to satisfy the minimal discovery requirements for the UE side.

Thus, the UE may carry following information in a message: the UE may directly request Type-2 resources; or the UE may ask the eNB to prioritize the UE's participation in D2D discovery; or the request message may be an indication to the eNB and can inform the eNB that the eNB needs to assign UL resources and message format for UE reporting on discovery status.

When a UE is configured to report or decides to report D2D discovery needs, it can follow the procedures described below. For example, for resource allocation type-1, or common resource allocation, UE may report to the eNB how frequent opportunities it desires to have for discovery signal transmission. UE may, for example, indicate that the UE is satisfied with rare opportunities or that the UE has unexpected discovery needs, beyond the normal discovery signal transmission cycle, or that the discovery needs have ended.

For resource allocation Type-2, or UE-specific resource allocation, once the UE has discovery needs, the UE can request the eNB to assign the UE-specific resource to the UE. Moreover, once the discovery needs end, the UE can report this to the eNB.

When eNB receives the report that UE has discovery needs, the eNB can take the UE needs into account by restricting scheduling in some DL subframes in order to increase discovery signal transmission opportunities according to the indicated needs. Also, the eNB may avoid scheduling PUSCH transmission on D2D subframes for a UE with discovery needs. Instead, the eNB may schedule PUSCH transmissions in D2D subframes for UEs without discovery needs. Alternatively, or in addition, the eNB can allocate Type-2 resources if available and if requested by the UE.

The eNB can also take the allocated Type-2 resources into account when scheduling DL and PUSCH.

Certain embodiments can be variously implemented. The following implementations may, therefore, be only examples of many possible implementations.

Configurations as to the eNB can include various aspects. Initially, all D2D discovery UEs, including idle mode and connected mode UEs, may be configured to use Type-1, for example common resource pool, to send discovery message. Later, the eNB may realize that there is a need to schedule PDSCH in a way that could possibly cause a conflict between UE's PUCCH and discovery signal transmission. The eNB may, for instance, know that a large amount of data will be transmitted in DL or, based on the statistics of past DL transmissions, deduce that DL transmission will be frequent in the future. Frequent DL transmissions may mean frequent PUCCH transmissions, in order to feedback DL acknowledgement/negative acknowledgment (ACK/NACK or A/N) to the eNB. As a UE cannot transmit PUCCH and discovery signals in the same subframe, depending on the priority of PUCCH and discovery signal transmissions, the UE may have too few opportunities for discovery signal transmission or discovery signal transmissions could block some PUCCH transmissions. When such a problem may potentially appear, the eNB can configure and trigger this connected mode UE to report to the eNB the UE's D2D discovery request.

As a UE cannot transmit simultaneously UL data on PUSCH and discovery signals, frequent PUSCH transmissions may cause a similar problem as large amount of DL data. The eNB may deduce from the past PUSCH transmissions that the UE might intend to transmit large amount of UL data also in the future and may trigger the UE to report to the eNB the UE's D2D discovery request.

Such procedures can take place with following steps. According to a first step, the eNB can use RRC signaling to indicate a physical layer resource in which the UE can send its report. Such physical layer resource can be a specific PUCCH resource that is located outside of D2D SFs. Any of the current PUCCH formats can be used to carry such reports. The eNB can indicate which format will be used. The format selected for use can depend on which discovery request information the eNB wants to obtain from UE side.

According to a second step, the eNB can use downlink control information (DCI) in physical downlink control channel (PDCCH) or enhanced PDCCH (ePDCCH) to trigger the UE for reporting with the settings configured in the first step.

Alternatively to the above two steps, instead of PUCCH, reports can be carried on PUSCH. In this case, DCI could indicate that UE must send a report on PUSCH.

The eNB can also indicate to the UE whether Type-2 resource allocation can be supported or applied to the connected mode UE. The eNB can make such a decision considering the eNB's resource utilization status and the UE's wish. For example, if there are numerous vacant resources in the cell, the eNB can configure Type-2 resource to the connected mode UE. Otherwise, Type-1 resource can be used as a common resource pool for all D2D UEs, including connected mode and idle mode UEs. On the UE side, when the eNB configures the UE to report the discovery request, the UE can assume the default resource allocation type is Type-1 unless the eNB explicitly indicates otherwise in the RRC signaling. Such explicit signaling could typically follow UE reporting its discovery needs.

When the eNB receives a report indicating an end of discovery needs, it may remove scheduling restrictions it has applied for avoiding situations where UE's transmissions of cellular and discovery signals would overlap. Also, eNB may release Type-2 resources allocated for the UE, and release the UL resource the eNB had assigned for the UE for D2D discovery request reports.

UE reporting of a discovery request can have various implementations. For example, for resource allocation Type-1, if PUCCH format 1a, carrying 1 bit, can be configured for UE reporting, with respect to which "1" can represent that the UE has a discovery request and "0" can represent the end of a discovery need. Sometimes more information may be useful as, for example, an eNB may need to know how frequently the UE wants the discovery signal to be sent. In such a case, the eNB may configure PUCCH format 1b, 2 bits, for UE reporting. In that case, "00", "01", "10", and "11" may respectively represent discovery needs have ended, a low frequency discovery request, a medium frequency discovery request, and a high frequency discovery request. More granularity can be included if another PUCCH format, such as format 3, is used or if the report is sent through PUSCH. When the eNB receives such UE reporting, the eNB can restrict scheduling in some DL subframes in order to increase the opportunities of discovery signals transmissions for the reporting UE.

For resource allocation Type-2, the usage and meaning of PUCCH indication can be the same as with resource allocation Type-1, as described above. A difference can be that when the eNB receives such reporting, the eNB can assign or release a Type-2 resource to a connected mode UE. When deciding how much of the possible resources the eNB will allocate for a UE, the eNB can consider the frequency level of the discovery request from the UE's reporting. The eNB can use, for example, either RRC signaling or DCI format to assign and/or release the Type-2 resource.

There can be other implementations of the above approaches. For example, a UE may find out that the UE cannot sufficiently utilize discovery resources due to frequent PUCCH or PUSCH transmissions. In such a case, the UE can indicate the problem to the eNB with a new control message. The control message can be a medium access control (MAC) control element (CE) or an RRC control message. The UE may include such control message in a PUSCH transmission. The resources for sending the request message can be obtained as for any other control message. The message may directly carry information regarding the UE needs, or the message may just be an indication for the eNB that the eNB should assign the UE resources on PUCCH that the UE would use for discovery related signaling.

Thus, for example, the UE may directly request Type-2 resources. Alternatively, the UE may ask the eNB to prioritize the UE's participation with respect to D2D discovery. In a further alternative, the request message may be an indication to the eNB and may inform eNB that eNB should assign UL resources and message format for UE reporting on the discovery status. In response to the request message, UE may be assigned UL resource and message format for the reporting.

Certain embodiments may have various benefits and/or advantages. For example, certain embodiments may address the issue of when D2D discovery signal and PUCCH A/N transmission conflict for an in coverage D2D discovery use case.

Figure 1:
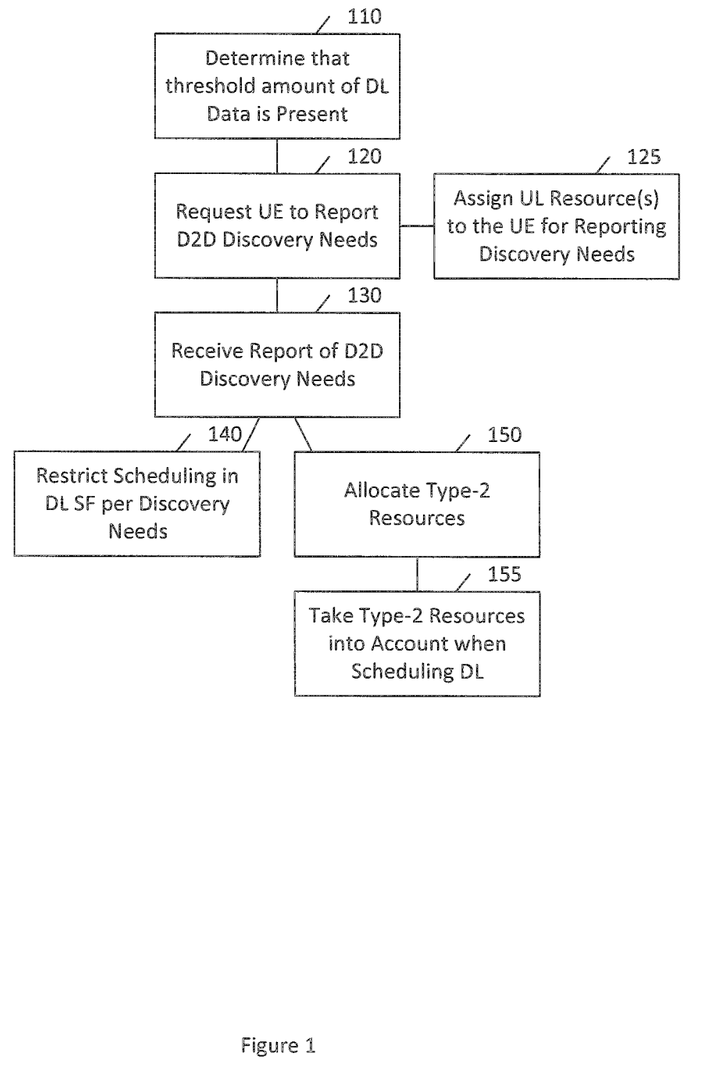
FIG. 1 illustrates a method according to certain embodiments.

FIG. 1 illustrates a method according to certain embodiments. The method of FIG. 1 may be performed by, for example, a network element, such as an access point, base station, or evolved Node B. As shown in FIG. 1, a method can include, at 110, determining that an amount of downlink data for a user equipment meets a predetermined threshold.

The method can also include, at 120, requesting the user equipment to report device to device discovery needs based on the amount meeting the predetermined threshold. The requesting can be further contingent on the user equipment being a radio resource control connected mode user equipment. The report can be received from the UE at 130, including an indication of the UE's discovery needs.

The method can further include, at 125, assigning an uplink resource to the user equipment in which to report the discovery needs. A specific format can be specified or assigned together with the uplink resource.

The method can additionally include, at 135, receiving an indication that the user equipment has discovery needs. The method can also include, at 140, restricting scheduling in at least one downlink subframe to increase discovery signal transmission opportunities according to the discovery needs.

Alternatively, the method can include, at 150, allocating Type-2 resources to the user equipment when available and requested by the user equipment. Furthermore, the method can include, at 155, taking the Type-2 resources into account when scheduling on a downlink.

Figure 2:
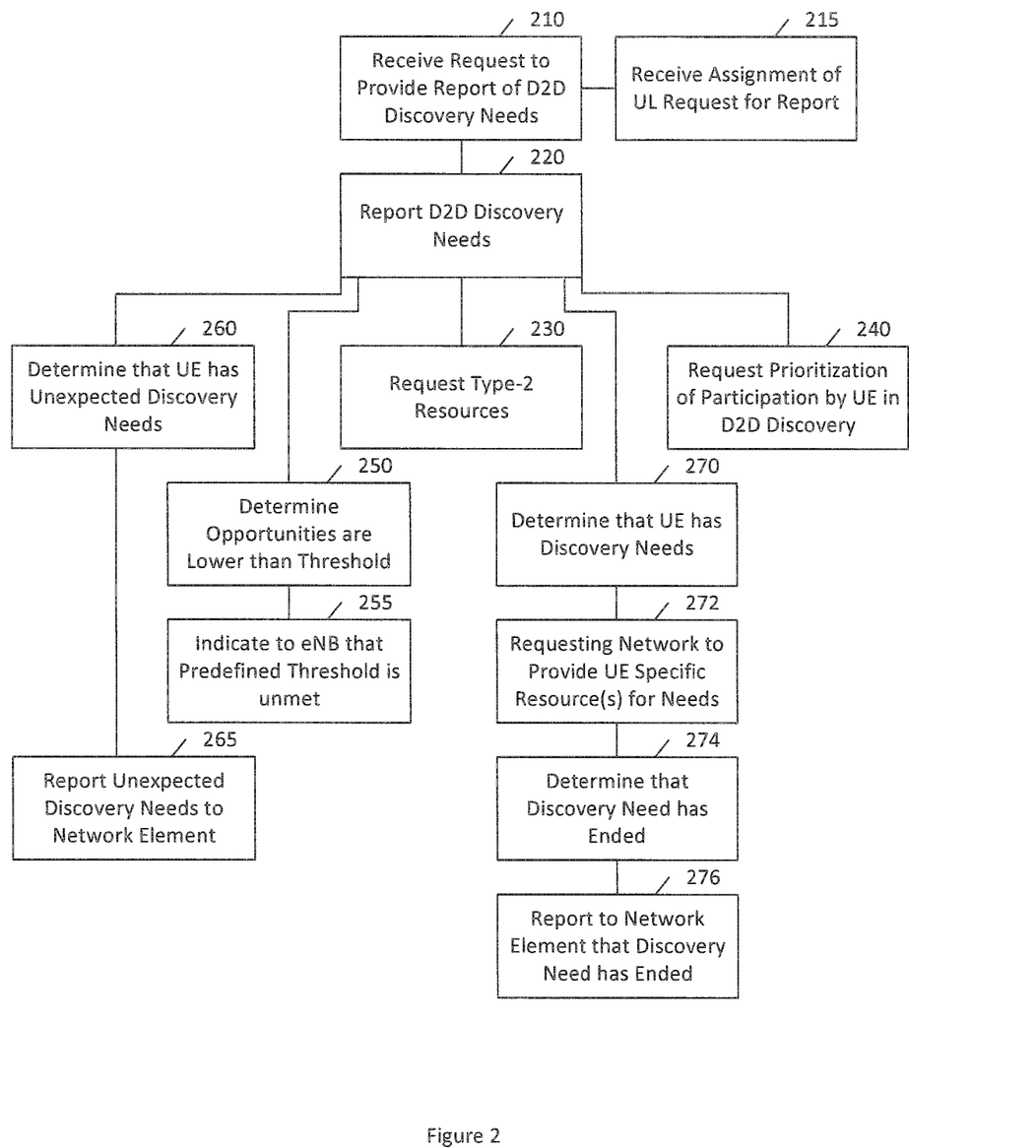
FIG. 2 illustrates another method according to certain embodiments.

FIG. 2 illustrates another method according to certain embodiments. The method of FIG. 2 may be performed by, for example, a user equipment, such as a terminal device, a mobile phone, a personal digital assistant, a personal computer, a tablet computer, a smart meter, or a sensor.

As shown in FIG. 2, a method can include, at 210, receiving a request to provide a report of device to device discovery needs. The method can also include, at 220, reporting the device to device discovery needs to a network element.

The method can further include, at 215, receiving an assignment of an uplink resource in which to include the report. Thus, the reporting can include initiating sending the report using the uplink resource. The assignment can also indicate a specific format to use in providing the report, and the reporting can include following the assigned format.

The method can also include, at 230, requesting Type-2 resources when providing the report. Alternatively, the method can include, at 240, requesting prioritization of participation by the user equipment in device to device discovery, when providing the report.

The method can further include, at 250, determining that opportunities to transmit discovery signals for a user equipment are lower than a predefined threshold. Furthermore, the method can include, at 255, indicating that the predefined threshold is not met, to the network element.

The method can additionally include, at 260, determining that a user equipment has unexpected discovery needs. The method can further include, at 265, reporting to the network element the unexpected discovery needs.

The method can also include, at 270, determining that a user equipment has discovery needs. The method can further include, at 272, requesting the network element to provide a user equipment specific resource for the discovery needs. Furthermore, the method can include, at 274, determining that the discovery needs have ended. Additionally, the method can include, at 276, reporting to the network element that the discovery needs have ended.

The method of FIG. 2 can work in coordination with the method of FIG. 1. Thus, a method may include both the method of FIG. 1 and the method of FIG. 2.

Other methods are also possible. For example, a method can include determining that a user equipment's opportunities to transmit device-to-device discovery signals are lower than a predefined value. The method can also include requesting Type-2 resources or requesting to prioritize the transmitting of the discovery signals.

The result of the determining can be indicated to an eNB through a higher layer signaling carried on PUSCH. Additionally, the requesting can sent from the user equipment to the eNB via a request message, which also indicates the eNB to assign uplink resources and message format for the user equipment to report discovery status.

Figure 3:
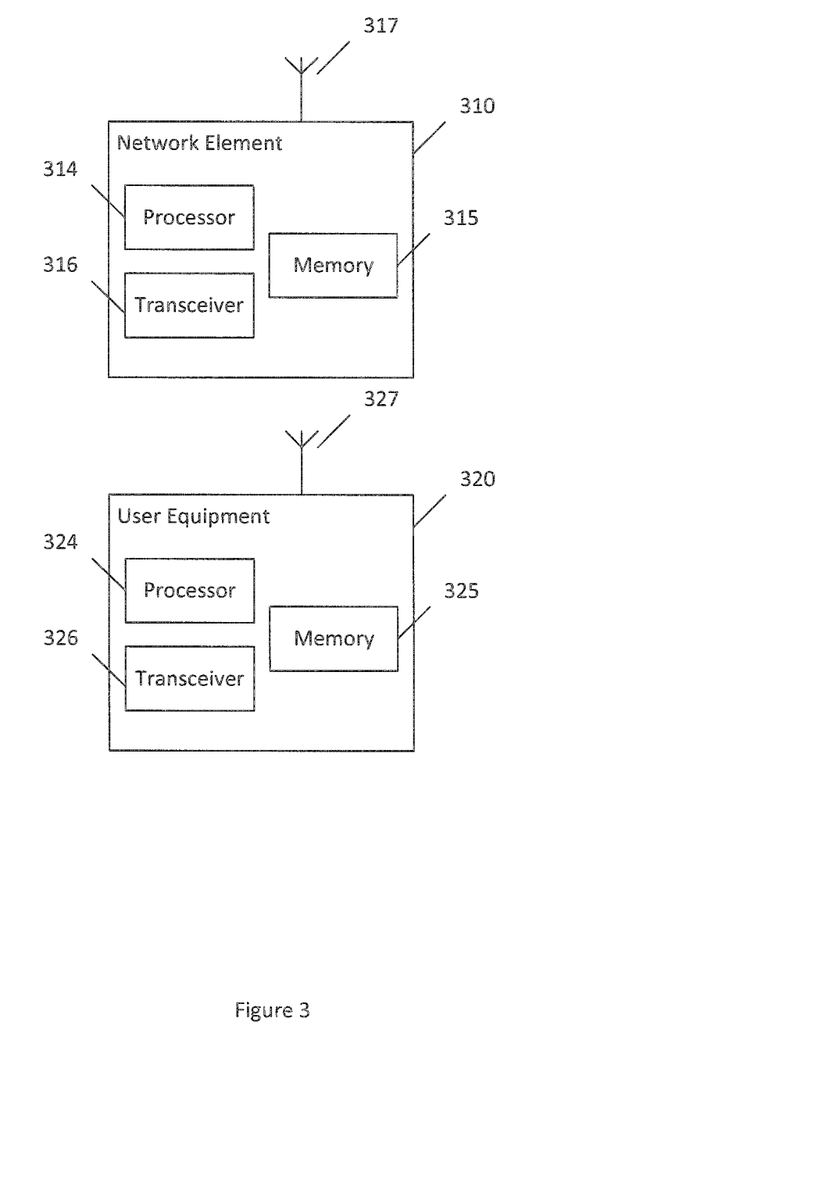
FIG. 3 illustrates a system according to certain embodiments.

FIG. 3 illustrates a system according to certain embodiments. It should be understood that each block of the flowchart of FIG. 1 or 2 and any combination thereof may be implemented by various means or their combinations, such as hardware, software, firmware, one or more processors and/or circuitry. In one embodiment, a system may include several devices, such as, for example, network element 310 and user equipment (UE) or user device 320. The system may include more than one UE 320 and more than one network element 310, although only one of each is shown for the purposes of illustration. A network element can be an access point, a base station, an eNode B (eNB), server, host or any of the other network elements discussed herein. Each of these devices may include at least one processor or control unit or module, respectively indicated as 314 and 324. At least one memory may be provided in each device, and indicated as 315 and 325, respectively. The memory may include computer program instructions or computer code contained therein. One or more transceiver 316 and 326 may be provided, and each device may also include an antenna, respectively illustrated as 317 and 327. Although only one antenna each is shown, many antennas and multiple antenna elements may be provided to each of the devices. Other configurations of these devices, for example, may be provided. For example, network element 310 and UE 320 may be additionally configured for wired communication, in addition to wireless communication, and in such a case antennas 317 and 327 may illustrate any form of communication hardware, without being limited to merely an antenna. Likewise, some network elements 310 may be solely configured for wired communication, and such cases antenna 317 may illustrate any form of wired communication hardware, such as a network interface card.

Transceivers 316 and 326 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element deliver local content. One or more functionalities may also be implemented as virtual application(s) in software that can run on a server.

A user device or user equipment 320 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

In an exemplary embodiment, an apparatus, such as a node or user device, may include means for carrying out embodiments described above in relation to FIG. 1 or 2.

Processors 314 and 324 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 315 and 325 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 310 and/or UE 320, to perform any of the processes described above (see, for example, FIGS. 1 and 2). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments of the invention may be performed entirely in hardware.

Furthermore, although FIG. 3 illustrates a system including a network element 310 and a UE 320, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node. The UE 320 may likewise be provided with a variety of configurations for communication other than communication network element 310. For example, the UE 320 may be configured for device-to-device communication.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. An apparatus, comprising:
   at least one processor; and
   at least one memory including computer program code,
   wherein the at least one memory and computer program code are configured to, with the at least one processor, cause the apparatus at least to:
   receive a request to provide a report of device to device discovery needs;
   in response to receiving the request to provide the report of device to device discovery needs, report the device to device discovery needs to a network element, wherein the reporting comprises requesting prioritization of participation by the apparatus in device to device discovery;
   determine that the discovery needs have ended; and
   report to the network element that the discovery needs have ended.

2. The apparatus of claim 1, wherein the at least one memory and computer program code are configured to, with the at least one processor, cause the apparatus at least to:
   receive an assignment of an uplink resource in which to include the report; and
   initiate sending the report using the uplink resource.

3. The apparatus of claim 1, wherein the at least one memory and computer program code are configured to, with the at least one processor, cause the apparatus at least to:
   determine that opportunities to transmit discovery signals for the apparatus are lower than a predefined threshold; and
   indicate that the predefined threshold is not met, to the network element.

4. The apparatus of claim 1, wherein the at least one memory and computer program code are configured to, with the at least one processor, cause the apparatus at least to:
   determine that the apparatus has unexpected discovery needs; and
   report to the network element the unexpected discovery needs.

5. The apparatus of claim 1, wherein the at least one memory and computer program code are configured to, with the at least one processor, cause the apparatus at least to:
   request the network element to provide a user equipment specific resource for the discovery needs.

6. The apparatus of claim 1, wherein the at least one memory and computer program code are configured to, with the at least one processor, cause the apparatus at least to request to prioritize transmission of discovery signals.

7. The apparatus of claim 1, wherein the requesting comprises:
   requesting Type-2 resources.

8. The apparatus of claim 1, wherein the apparatus comprises a user equipment or a user device.

9. A method, comprising:
   receiving, by a user equipment, a request to provide a report of device to device discovery needs;
   in response to receiving the request to provide the report of device to device discovery needs, reporting, by the user equipment, the device to device discovery needs to a network element, wherein the reporting comprises requesting prioritization of participation by the user equipment in device to device discovery;

determining, by the user equipment, that the device to device discovery needs have ended; and reporting, by the user equipment, to the network element that the device to device discovery needs have ended.

10. The method of claim 9, further comprising:

receiving, by the user equipment, an assignment of an uplink resource in which to include the report; and initiating, by the user equipment, sending the report using the uplink resource.

11. The method of claim 9, wherein the requesting comprises:

requesting, by the user equipment, Type-2 resources.

12. The method of claim 9, further comprising:

determining, by the user equipment, that opportunities to transmit discovery signals for a user equipment are lower than a predefined threshold; and indicating, by the user equipment, that the predefined threshold is not met, to the network element.

13. The method of claim 9, further comprising requesting, by the user equipment, the network element to provide a user equipment specific resource for the discovery needs.

14. The method of claim 9, further comprising:

determining, by the user equipment, that the user equipment has unexpected discovery needs; and reporting, by the user equipment, to the network element the unexpected discovery needs.

15. The method of claim 9, further comprising:

requesting, by the user equipment, to prioritize transmission of discovery signals.

16. An apparatus, comprising:

at least one processor; and at least one memory including computer program code, wherein the at least one memory and computer program code are configured to, with the at least one processor, cause the apparatus at least to:

receive a report, from a user equipment, of device to device discovery needs, wherein the report comprises at least one request for prioritization of participation by the user equipment in device to device discovery;

grant the at least one request for prioritization of participation in the device to device discovery; and receive a report that the device to device discovery needs of the user equipment have ended.

17. The apparatus of claim 16, wherein the at least one memory and computer program code are configured to, with the at least one processor, cause the apparatus at least to receive the report on a higher layer signaling carried on physical uplink shared channel.

18. The apparatus of claim 16, wherein the at least one memory and computer program code are configured to, with the at least one processor, cause the apparatus at least to receive the report from the user equipment via a request message, which also indicates the apparatus to assign uplink resources and message format for the user equipment for reporting discovery status.

19. A method, comprising:

receiving, by a network entity, a report from a user equipment of device to device discovery needs, wherein the report comprises at least one request for prioritization of participation in device to device discovery;

granting, by the network entity, the at least one request for prioritization of participation in the device to device discovery; and receiving, by the network entity, a report that the device to device discovery needs of the user equipment have ended.

20. The method of claim 19, further comprising:

receiving, by the network entity, the report on a higher layer signaling carried on physical uplink shared channel.

21. The method of claim 19, further comprising:

receiving, by the network entity, the report from the user equipment via a request message, which also indicates the network entity to assign uplink resources and message format for the user equipment for reporting discovery status.

* * * * *